United States Patent [19]

Siewert

[11] 3,896,774
[45] July 29, 1975

[54] STAGED INTERNAL COMBUSTION ENGINE WITH MODULATING INTERSTAGE TEMPERATURE CONTROL

[75] Inventor: Robert M. Siewert, Birmingham, Mich.

[73] Assignee: General Motors Corporation, Detroit, Mich.

[22] Filed: July 5, 1974

[21] Appl. No.: 485,940

[52] U.S. Cl............. 123/59 EC; 123/1 R; 123/52 R
[51] Int. Cl............................................. F02b 75/20
[58] Field of Search.......... 123/119 E, 59 EC, 52 R, 123/37, 1 R, 3; 60/39.17

[56] References Cited
UNITED STATES PATENTS

| | | | |
|---|---|---|---|
| 1,362,080 | 12/1920 | Chorlton........................ | 123/59 EC |
| 2,113,601 | 4/1938 | Pratt.................................. | 123/1 R |
| 2,113,602 | 4/1938 | Pratt.................................. | 123/1 R |
| 3,717,130 | 2/1973 | Thornburgh.................... | 123/119 A |
| 3,805,752 | 4/1974 | Cataldo.......................... | 123/59 EC |

*Primary Examiner*—Wendell E. Burns
*Assistant Examiner*—David D. Reynolds
*Attorney, Agent, or Firm*—Robert J. Outland

[57] ABSTRACT

A staged internal combustion engine with a bypass heat exchanger in the interstage manifold and a temperature control valve arranged to modulate the flow of interstage gases between the heat exchanger and bypass passages so as to control the temperature of interstage gases delivered to the second stage combustion chamber. Automatic control means including in a preferred embodiment a plurality of expandable bellows are made responsive to various engine operating conditions, such as the final interstage gas temperature, engine speed and engine load to vary the interstage gas temperature in a predetermined manner and maintain desired conditions for efficient second stage combustion.

4 Claims, 3 Drawing Figures

STAGED INTERNAL COMBUSTION ENGINE WITH MODULATING INTERSTAGE TEMPERATURE CONTROL

FIELD OF THE INVENTION

This invention relates to internal combustion engines of the staged combustion type and more particularly to means including an automatically controlled bypass heat exchanger for maintaining desired interstage gas temperatures in such engines.

BACKGROUND OF THE INVENTION

It is known in the art to arrange an internal combustion engine to perform the combustion of a fresh charge of fuel in two separate sequential working cycles having separate stages of combustion and each yielding an output of work to the engine output shaft.

The general method of operation of such engines, which I refer to as staged combustion engines, involves the admission of a rich air-fuel charge to an engine combustion chamber wherein it is passed through a first stage working cycle including compression, combustion and expansion steps. This cycle results in the delivery of power to the engine output shaft and leaves a residual charge of combustion products and incompletely burned combustibles. To this charge, air is added to form a second and preferably somewhat lean combustible mixture heavily diluted with burned gases. This mixture is passed through a second stage cycle of compression, combustion and expansion, again yielding work to the engine output shaft.

Such a process is capable of being performed sequentially in the same engine combustion chamber. However, it is presently believed preferable to utilize separate combustion chambers of the same engine for performance of the two combustion cycles and to transfer the products resulting from the first stage combustion cycle to the second stage combustion chamber through a connecting interstage passage, conduit or manifold in which the necessary secondary combustion air is added.

Various forms of staged combustion engines have been proposed. Among these are the arrangements disclosed in U.S. Pat. Nos. 2,113,601 and 2,113,602, both granted Apr. 12, 1938 to N. P. Pratt. Additional forms and methods of operation of such engines are disclosed in my copending U.S. patent application Ser. No. 282,390, filed Aug. 21, 1972 and published Jan. 28, 1975, as B 282,390.

In experimental work with staged combustion engines operating with gasoline fuel-air mixtures, I have preferred to utilize conventional spark ignition for initiating first stage combustion. However, I have found that satisfactory engine operation may be obtained under properly controlled conditions utilizing either compression ignition or conventional spark ignition for initiation of second stage combustion.

Both methods of operation have been shown to require some degree of temperature control of the interstage gases in order to maintain engine operation and efficiency under the varying loads and speeds required of automotive type engines. For example, my copending U.S. application Ser. No. 282,390 discloses that interstage gas temperatures must be controlled within predetermined ranges which are functions of other engine variables such as engine speed, load and second stage compression ratio, in order to realize the efficient timing of second stage ignition when compression or auto-ignition is utilized. The use of spark ignition in the second stage reduces the criticality but does not eliminate the need for interstage temperature control; since, if the temperature of gas admitted to the second stage is too low, misfiring may occur; while if the temperature is too high, pre-ignition will occur, resulting in overadvanced timing and inefficient operation. In addition, some degree of interstage temperature control is necessary to prevent inefficient thermal reaction in the interstage manifold.

SUMMARY OF THE INVENTION

The present invention provides fast responding means for controlling interstage gas temperatures in staged internal combustion engines, in order to maintain such temperatures within desired ranges under varying conditions of engine operation. More specifically, the invention provides for modulating control of interstage gas temperatures by the use of a bypass heat exchanger in the interstage manifold with suitable control means for modulating the flow on interstage gases between the heat exchanger and the bypass passage.

One feature of a cooling system according to the invention is that it provides a dual pass interstage manifold for a staged combustion engine having a heat exchanger in one path while the other path serves as bypass around the heat exchanger. A modulating valve in the interstage manifold or passage is provided to control the flow of gases between the heat exchanger and bypass passages.

Another feature of the invention is that automatic control means are provided to regulate the position of the modulating valve in response to various engine operating conditions so as to maintain desired temperatures of interstage gas supplied to the second stage combustion chamber.

Still another feature of the invention is that the valve control means includes actuating means responsive to final interstage gas temperature as modulated by means responsive to engine speed and load.

Yet another feature of the invention is that the heat exchanger serves as means for cooling the interstage gases. Also, the walls of the interstage manifold, except for the heat exchanger passage, are insulated to prevent excessive loss of heat from the interstage gases directed through the bypass passage.

These and other features of the invention will be more fully understood from the following description of certain preferred embodiments taken together with the accompanying drawings.

DESCRIPTION OF THE ILLUSTRATED EMBODIMENTS

Figure 1:
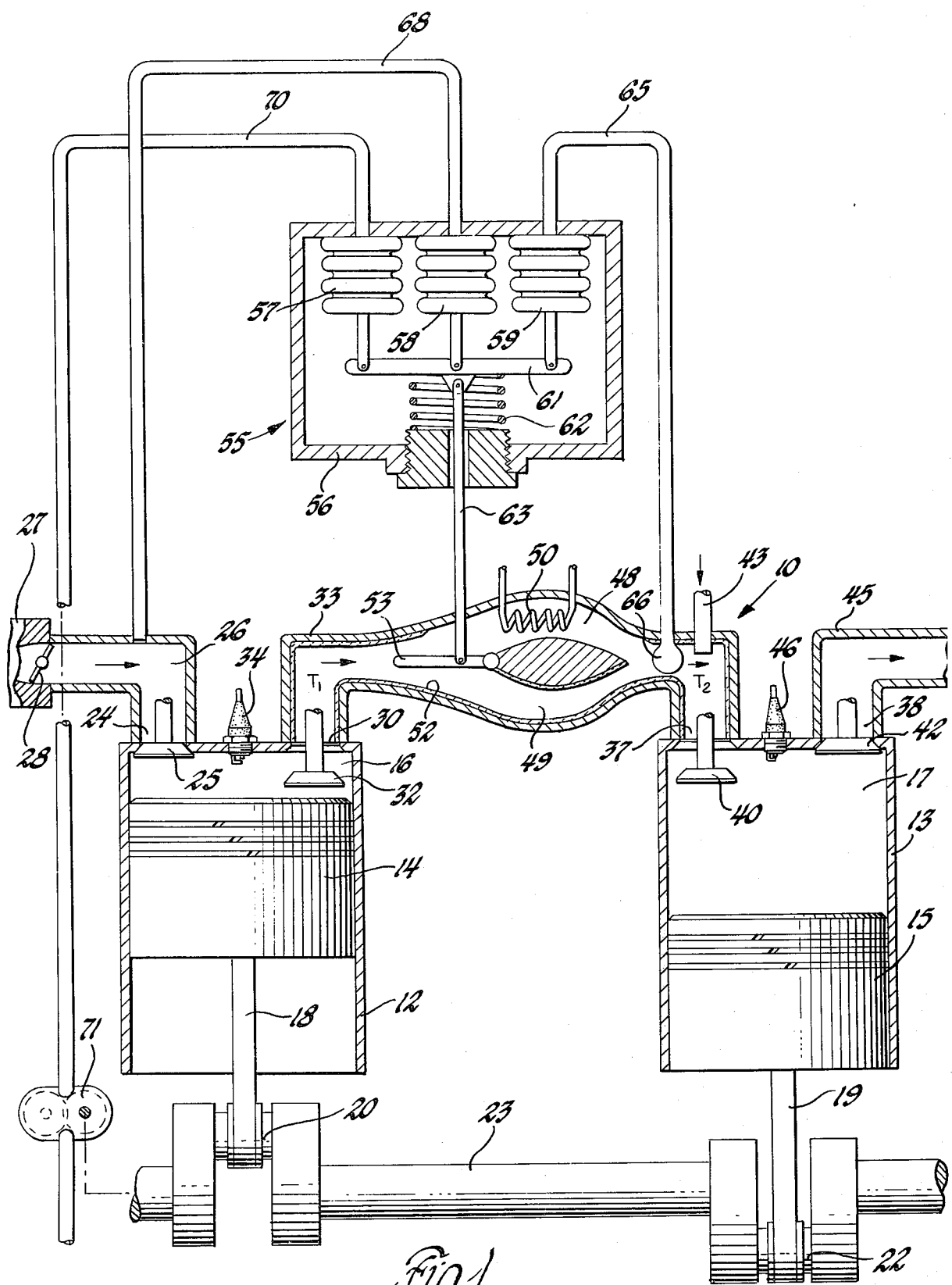
FIG. 1 is a diagrammatic view of a staged internal combustion engine having modulating interstage gas temperature control means in accordance with the invention.

Referring first to FIG. 1 of the drawings, numeral 10 generally indicates an internal combustion engine of the staged combustion type and having a pair of cylinders 12, 13 containing reciprocating pistons 14, 15 respectively and defining therewith variable volume working and combustion chambers 16, 17, respectively. Pistons 14, 15 are respectively connected by connecting rods 18, 19 to the oppositely eccentric throws 20, 22 of a crankshaft 23.

Cylinder 12 includes an inlet port 24 controlled by an inlet poppet valve 25 and connected through an inlet manifold or conduit 26 with a source of air and fuel mixture, such as a carburetor 27, having a throttle 28. Cylinder 12 also includes an exhaust or outlet port 30 controlled by an exhaust poppet valve 32 and connecting with an interstage manifold or conduit 33. A spark plug 34 is provided in the cylinder 12 to ignite combustible fuel mixtures in the combustion chamber 16.

Cylinder 13 includes inlet and exhaust ports 37, 38 controlled respectively by an inlet poppet valve 40 and an exhaust poppet valve 42. Inlet port 37 connects through the interstage manifold 33 and exhaust port 30 with the combustion chamber 16 of cylinder 14. An air admission pipe 43 extends into the interstage manifold 33 at a point adjacent the second stage inlet port 37 to provide secondary combustion air for mixture with the interstage gases supplied to the second stage combustion chamber 17. An exhaust conduit 45 connects with the exhaust port 38 to carry away the second stage exhaust gases. A spark plug 46 is provided in cylinder 13 to ignite combustible fuel mixtures in the combustion chamber 17.

The operation of the engine portions so far disclosed is as follows:

Upon rotation of the crankshaft, pistons 14 and 15 reciprocate in their respective cylinders in timed relation with the valves so as to cause the combustion chambers 16, 17 to cyclically perform four-stroke cycles, including the steps of intake, compression, expansion and exhaust. Carburetor 27 supplies air-fuel mixtures, preferably rich in fuel, to the inlet manifold 26 which are admitted in amounts controlled by the throttle 28 to the combustion chambers 16 on the intake strokes of piston 14. Here the charges are compressed, ignited by the spark plug 34, burned and expanded, delivering power to the crankshaft.

The remaining gases consisting of combustion products and residual combustibles which there was insufficient air to burn in the first stage are exhausted on the exhaust strokes of piston 14 into the interstage manifold 13. Here secondary air is added through air admission pipe 43 which mixes with the first stage exhaust gases to form heavily diluted and preferably somewhat lean combustible mixtures that are admitted to the second stage combustion chamber 17 on the intake strokes of piston 15. These charges are then compressed, ignited by the spark plug 46, burned and expanded in chamber 17, with the resultant delivery of power to the crankshaft. Subsequently, exhaust valve 42 is opened and the burned gases are exhausted through exhaust conduit 45.

As disclosed in my previously mentioned application Ser. No. 282,390, the engine may also be operated, utilizing compression ignition of charges in the second stage combustion chamber 17. Also if desired, both spark and compression ignition could be utilized in the second stage cylinder under varying operating circumstances. If compression ignition is used exclusively, the spark plug 46 could be dispensed with. Further, the second stage cylinder could be provided with means, such as a movable piston, for varying the compression ratio of the second stage combustion chamber in order to assist in controlling the timing of ignition when compression ignition is used.

Also in accordance with my previously mentioned application, suitable means, such as a heat exhanger, could be provided in the interstage manifold 33 to control the temperature of the interstage gases in the manner required for proper operation of the engine. In general, such control involves maintaining the temperature of the interstage gases delivered to the second stage cylinder within predetermined temperature ranges suitable for various engine operating conditions so that misfiring due to excessively cold temperatures and preignition due to excessively high temperatures are both avoided. In addition, it is desirable to maintain interstage gas temperatures below a predetermined level to avoid undesired reaction of combustibles in he interstage gases with the secondary combustion air added in the interstage manifold.

In accordance with the present invention, control of interstage gas temperatures may be accomplished by the novel means and methods hereinafter described. The interstage manifold 33 is in part provided with dual gas flow passages 48, 49 extending in parallel relationship and connected intermediate the ends of the manifold 33. A fluid heat exchanger 50 is disposed within passage 48 in heat exchange relation with the gases passing therethrough. Heat exchanger 50 may be connected with any suitable source of coolant, such as air from an engine driven air pump, engine cooling water supplied by an engine driven water pump, or another suitable coolant source. Additionally, or alternatively if desired, the heat exchanger 50 may be connected with a source of hot fluid for heating the interstage gases under certain conditions.

Passage 49 extending in parallel with the passage 48 acts as a bypass around the heat exchanger 50, permitting the flow of interstage gases from the first to the second stage combustion chambers either through or around the heat exchanger. The walls of the interstage manifold passages may be insulated as at 52 by any suitable insulating material. As shown however, the walls of passage 48 need not be insulated when the heat exchanger 50 is utilized to cool the interstage gases, since heat loss through the wall of this passage in effect adds to the cooling capacity of the heat exchanger.

Manifold 33 is additionally provided with a pivotally mounted vane 53 which is movable within the manifold between extreme positions, blocking the flow of interstage gases through one of the flow passages 48, 49. The vane 53 thus acts as a modulating valve controlling the amount of gas directed past the heat exchanger 50 and thereby controlling the degree of cooling or other heat transfer applied to the interstage gases.

Figure 2:
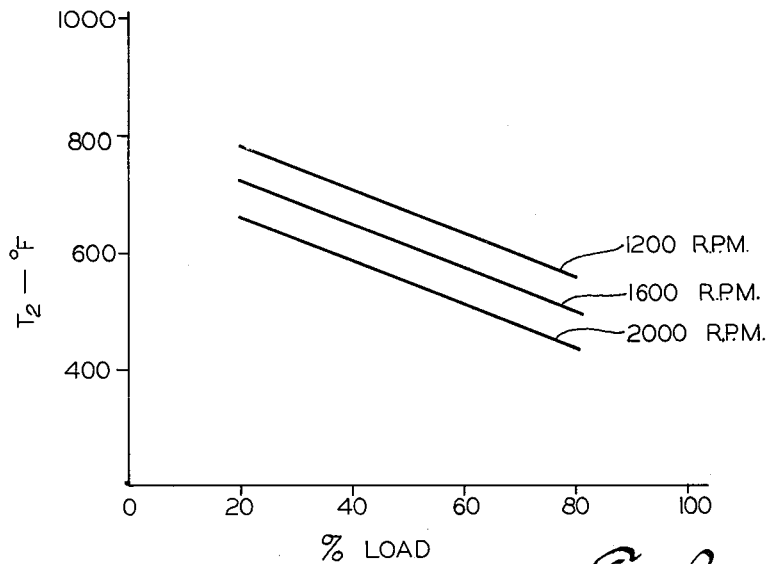
FIG. 2 is a graph indicating the relationships of final interstage gas temperature, engine speed and percent of maximum load found desirable for operating a staged combustion engine of the type shown in FIG. 1.

FIG. 2 indicates a desired relationship of final interstage gas temperature, before the addition of supplementary air through pipe 43, to the other operating conditions of engine speed and percent of maximum load which tests indicated were suitable for proper operation of a specific embodiment of an engine of the type described. While the specific numerical values may vary in particular engine embodiments, the figure indicates generally that as engine speed and/or load are increased, the final interstage gas temperature must be reduced in order to maintain the desired operating conditions. If the interstage temperature is allowed to exceed the desired levels, pre-ignition of the charge in the second stage cylinder may occur with resultant loss of engine efficiency.

To maintain the desired interstage gas temperatures with the heat exchanger 50 operating as a cooling device, the invention provides for the use of automatic control means for modulating the position of the valve 53 in accordance with the cooling requirements under the various operating conditions. In the embodiment of FIG. 1, the control means take the form of a control unit 55 having a housing 56 containing three expandable bellows members 57, 58 and 59, each having one end mounted on the housing 56. The free ends of the bellows are connected to a reaction bar 61 which is biased by a spring 62 in a direction to compress the bellows 57, 58, 59. Bar 61 connects through an actuator link 63 with the vane 53 of the modulating control valve in a manner such that the spring 62 biases the valve 53 in a direction to close off flow to the heat exchanger 50.

Bellows 59 is connected through a conduit 65 with a fluid filled bulb 66 located within the interstage manifold 33 after the juncture of the passages 48, 49 so as to be in contact with the mixture of gases passing through and bypassing heat exchanger. Bulb 66 may contain any suitable temperature responsive fluid which increases in pressure as the temperature is increased so as to supply an increasing pressure, tending to expand the bellows 59 upon increasing final interstage gas temperature.

Bellows 58 connects through a conduit 68 with the engine inlet manifold 26 so that as the inlet manifold pressure increases (vacuum decreases) as occurs on increasing engine load, the pressure in the bellows 58 is increased, tending to expand to the bellows. Bellows 57 is connected through a conduit 70 with the outlet side of an oil pump 71 which is driven by the engine crankshaft 23 so that its speed and output pressure vary as a function of engine speed. Accordingly, increasing engine speed increases the pressure on bellows 57, causing it to tend to expand.

In operation, the control unit is adjusted so that when the engine is started the valve 53 is in its bypass position, blocking the flow of interstage gases through the heat exchanger 50, as long as the interstage gas temperatures are below the desired operating level. In this condition, the loss of heat in the interstage manifold is minimized by the insulation 52 along the walls of the manifold and bypass passage. As the interstage gas temperature increases due to engine operation, the bulb 66 is heated, causing expansion of the bellows 59 against the force of spring 62 and pivoting the valve 53 downwardly in a direction partially opening the passage 48. This permits some of the interstage gases to pass through the heat exchanger 50, causing a reduction in temperature. Thereafter the valve 53 is positioned by operation of the temperature responsive bellows 59 and bulb 66 so as to maintain the final interstage gas temperature at the bulb 66 at the desired level.

An increase in the engine speed causes an increase in the output pressure of oil pump 71, thereby expanding bellows 57 and further opening valve 53. This has the effect of lowering the effective control temperature of the system in the desired degree as indicated by the FIG. 2. In like manner, an increase in engine load caused by opening the throttle 28 reduces the manifold vacuum, causing an increase in the absolute pressure in bellows 58, thereby causing further opening of the valve 53 to increase the cooling of the gases in the degree desired.

In the foregoing manner, the control system senses the engine operating conditions of final interstage gas temperature, engine speed and engine load and modulates the interstage gas temperature to maintain the desired temperature for proper engine operation. The response of the system is very fast depending mainly on the ability of the control system to respond to changing engine conditions and move the valve 53 accordingly. Movement of the valve immediately changes the relative amounts of interstage cases passing through and around the heat exchanger and thus has an immediate effect on final interstage gas temperature. The masses of the heat exchanger and the coolant used therein are thus eliminated as factors in the response time of the system. Accordingly, the invention provides more suitable arrangements for varying engine operating conditions than systems wherein the heat exchanger coolant temperature is varied to control interstage gas temperature.

It should be apparent that many other forms of control mechanisms could be suitably applied to accomplish essentially the same purposes, and thus the invention is not intended to be limited to the specific form of mechanism described herein. In addition, as previously mentioned, the heat exchanger 50 could be utilized during engine warm-up to provide heat to the interstage gases.. However, such action would require a modification of the control system to permit interstage gas flow through the heat exchanger during the warm-up period.

Figure 3:
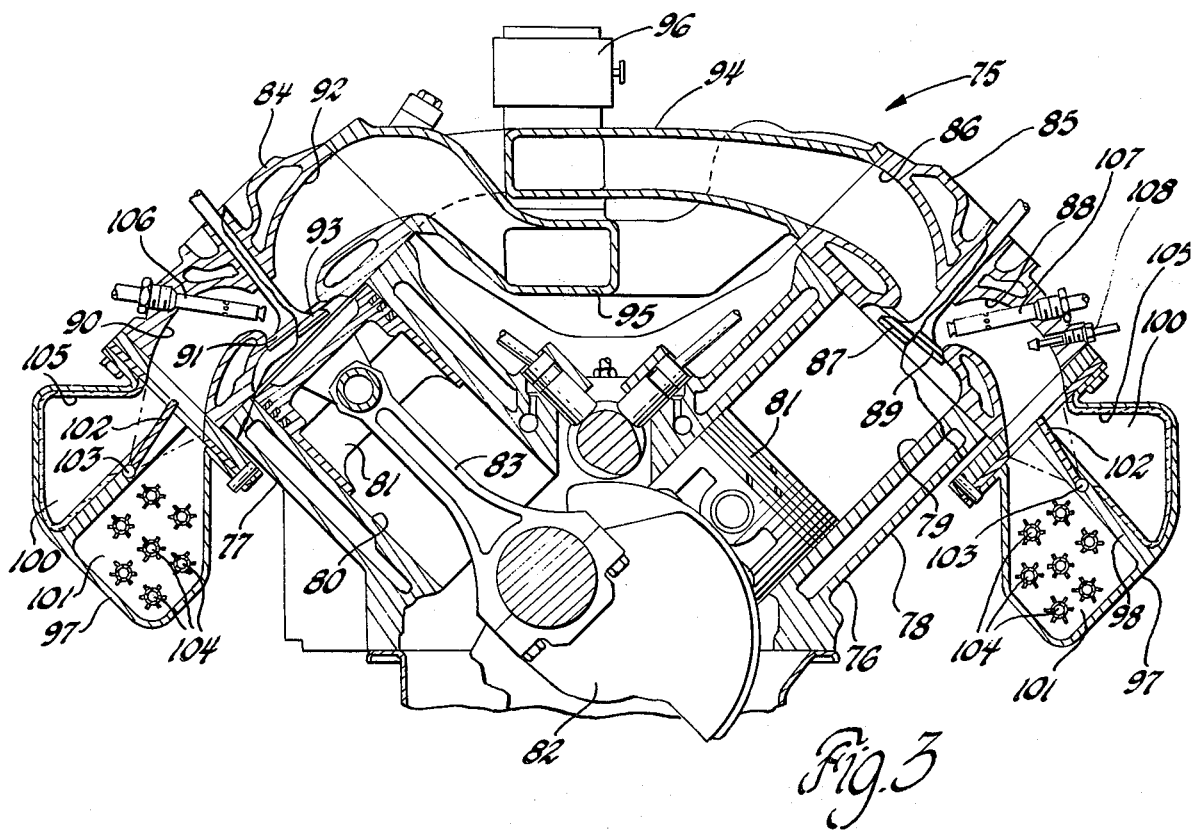
FIG. 3 is a cross sectional view illustrating a V-8 staged combustion engine arrangement including modulating interstage gas temperature control means in accordance with the invention.

FIG. 3 shows a staged combustion engine 75 of the eight cylinder V-type having the first and second stage cylinders and manifolds arranged in a manner generally similar to that shown in FIG. 3 of my previously mentioned U.S. patent application Ser. No. 282,390. Engine 75 includes a cylinder block 76, having two angularly disposed banks 77, 78 of cylinders conventionally arranged in groups of four and including in each bank two first and two second stage cylinders 79, 80, respectively. The cylinders contain conventionally arranged pistons 81 connected with a crankshaft 82 by connecting rods 83. The ends of the cylinders are closed by cylinder heads 84, 85 containing more or less conventionally arranged ports connecting each cylinder with the inner and outer sides of its respective head and controlled by a poppet valve. The inwardly opening ports 86 connected with each first stage cylinder 79 are utilized as inlet ports controlled by an inlet valve 87. While the outwardly opening ports 88 comprise first stage cylinder exhaust ports controlled by exhaust valves 89. On the other hand, the outwardly opening ports 90 connected with the second stage cylinders are used as second stage inlet ports controlled by inlet valves 91, while the inwardly opening ports 92 are used as second stage exhaust ports controlled by exhaust valves 93.

The inlet ports 86 of each first stage cylinder are connected with one of the four legs of a single plane inlet manifold 94, while the exhaust ports 92 of each second stage cylinder likewise connect with one of the four legs of a single plane exhaust manifold 95. A carburetor 96 is mounted atop a central plenum of the inlet manifold 94 to supply rich air-fuel mixture thereto, while the exhaust manifold has a central plenum mounted below and connecting with the inlet manifold plenum to provide exhaust heat to the intake manifold mixture in more or less conventional fashion.

Each cylinder head has an interstage manifold 97 mounted on and extending longitudinally along its outer wall and connecting with the outwardly opening exhaust and intake ports 88, 90 of the first and second stage cylinders, respectively. Each interstage manifold contains a longitudinally extending wall 98 separating the manifold into upper and lower sections 100 and 101, respectively. A valve plate 102 at each port location is mounted on a pivotable axle 103 connecting externally of each manifold with suitable control mechanism (not shown) permitting movement of the valve plates to modulate the flow of gases into the upper or lower sections of the interstage manifold. If desired, the valve plates at either the inlet or exhaust port locations may be eliminated. The lower section of each manifold contains a plurality of longitudinally extending coolant carrying finned tubes 104, while the upper section of each manifold has its interior walls covered with insulation 105.

Air admission pipes 106 are installed in the second stage cylinder inlet ports 90 for supplying secondary combustion air to the second stage cylinders. In addition, similar air admission pipes 107 and water spray nozzles 108 may be installed in the first stage cylinder exhaust ports 88 for purposes to be subsequently described.

In operation, carburetor 96 supplies rich air-fuel mixtures through the inlet manifold 94 and inlet ports 86 to the first stage cylinders 79. After burning, these mixtures pass out through exhaust ports 88 to the interstage manifolds where they are proportionably directed through the upper or lower portions of the manifolds to the inlet ports 90 of the second stage cylinders of the same bank. Movement of the modulating valves 102 by suitable control mechanism (not shown) proportions the flow either through the insulated upper section or along the cooling coils of the lower section to control the interstage gas temperature in the inlet ports 90 in the manner described with respect to the embodiment of FIG. 1. Secondary air is supplied to the inlet ports 90 through admission pipes 106, mixing with the interstage gases supplied to the second stage cylinders 80. After burning, the second stage exhaust gases are passed through exhaust ports 92 to the exhaust manifold 95 and thence to atmosphere through a suitable system.

If desired, additional control of the interstage gas temperature may be provided by adding air or water to the first stage exhaust ports 88 through the admission pipes 107 and water nozzles 108, respectively, located in the first stage exhaust ports. The addition of air at this point causes reaction with the unburned fuel in the first stage exhaust gases, thereby tending to raise the interstage gas temperatures while the addition of water through water nozzles 108 reduces the interstage gas temperature through the heating and vaporization of the added water.

While the invention has been described by reference to certain preferred embodiments, it should be understood that numerous changes could be made without departing from the inventive concepts disclosed. Accordingly, the scope of the invention is intended to be defined only by the language of the following claims.

What is claimed is:

1. A staged combustion engine including means defining first and second stage expansible combustion chambers each having an inlet port and an exhaust port, means connected with an output shaft to cyclically expand and contract said chambers and control said ports whereby to cause consecutive admission and combustion of combustible mixtures therein and subsequent exhaust of burned mixtures from said chambers, with a resultant delivery of power to said output shaft, an inlet conduit connected with said first stage inlet port for supplying a rich combustible air-fuel mixture to said first stage combustion chamber, an interstage conduit connecting the exhaust port of ssaid first stage chamber to the inlet port of said second stage chamber, said interstage conduit including a first gas flow path containing a heat exchanger and a second gas flow path connected in parallel with said first flow path and bypassing said heat exchanger, valve means in said interstage conduit and movable between a first position blocking said first flow path and a second position blocking said second flow path to proportion the flow of interstage gas through and around said heat exchanger, and automatic control means connected with said valve means and responsive to at least one variable condition of engine operation to regulate the position of said valve means so as to control the flow of gases through and around said heat exchanger and thereby the temperature of the interstage gases supplied to said second stage combustion chamber in a predetermined manner with respect to said at least one engine operating condition.

2. A staged combustion engine including means defining first and second stage expansible combustion chambers each having an inlet port and an exhaust port, means connected with an output shaft to cyclically expand and contract said chambers and control said ports whereby to cause consecutive admission and combustion of combustible mixtures therein and subsequent exhaust of burned mixtures from said chambers, with a resultant delivery of power to said output shaft, an inlet conduit connected with said first stage inlet port for supplying a rich combustible air-fuel mixture to said first stage combustion chamber, an interstage conduit connecting the exhaust port of said first stage chamber to the inlet port of said second stage chamber, and interstage conduit including a first gas flow path containing a heat exchanger and a second gas flow path connected in parallel with said first flow path and bypassing said heat exchanger, valve means in said interstage conduit and movable between a first position blocking said first flow path and a second position blocking said second flow path to proportion the flow of interstage gas through and around said heat exchanger, and automatic control means having an actuating member connected with said valve means and a plurality of condition responsive means connected with said actuating member, said condition responsive means being connected with various portions of said engine and responsive to predetermined operating conditions of said engine portions to position said actuating member and said valve means in a predetermined manner for regulating the flow of gases through and around said heat exchanger and thereby the temperature of the interstage gases supplied to said second stage combustion chamber.

3. A staged combustion engine including means defining a plurality of first and second stage expansible combustion chambers each having an inlet port and an exhaust port, means connected with an output shaft to cyclically expand and contract said chambers and control said ports whereby to cause consecutive admission and combustion of combustible mixtures therein and subsequent exhaust of burned mixtures from said chambers, with a resultant delivery of power to said output shaft, a throttled inlet conduit connected with said first stage inlet ports for supplying a rich combustible air-fuel mixture to said first stage combustion chambers, interstage conduit means connecting the exhaust ports of said first stage chambers to the inlet ports of said second stage chambers, said interstage conduit means including a first gas flow path containing a cooling device and a second gas flow path connected in parallel with said first flow path and bypassing said cooling device, valve means in said interstage conduit means and movable between a first position blocking said first flow path and a second position blocking said second flow path to proportion the flow of interstage gas through and around said cooling device, and automatic control means having an actuating member connected with said valve means and first second and third condition responsive means connected with said actuating member, said first condition responsive means being connected with a portion of said interstage conduit means between said parallel flow paths and said second stage inlet port and responsive to interstage gas temperatures in said conduit means portion to move said actuating member so as to maintain predetermined temperatures therein, said second condition responsive means being connected with an engine load indicating signal and responsive to changes in a load indicating condition thereof to modify said predetermined temperatures maintained by said first means and said third condition responsive means being connected to a moving portion of said engine and responsive to the speed of motion of such moving portion to further modify said predetermined temperatures maintained by said first means, whereby said automatic control means actuates said valve means to control final interstage gas temperatures at a predetermined temperature varied as a function of engine speed and load.

4. A staged combustion engine having a cylinder block, a plurality of aligned cylinders including both first and second stage cylinders in said cylinder block and opening through one end thereof, a cylinder head closing the ends of said cylinders, pistons reciprocably disposed in said cylinders and defining therein variable volume combustion chambers, said pistons being connected with an output shaft for the delivery of power thereto, said cylinder head having a pair of valve controlled ports connecting with each cylinder including an inlet port and an exhaust port, the inlet ports of the first stage cylinders and the exhaust ports of the second stage cylinders opening through one side of said cylinder head and the exhaust ports of the first stage cylinders and the inlet ports of the second stage cylinders extending toward another side of said cylinder head and generally aligned longitudinally thereof, an inlet manifold connected with the first stage inlet ports for delivering air-fuel mixture thereto, an exhaust manifold connected with the second stage exhaust ports for receiving exhaust gases therefrom, said inlet and exhaust manifolds having connecting portions in heat exhange relation to transfer exhaust gas heat to the air-fuel mixture in the inlet manifold, interstage manifold means extending longitudinally of said head along said another side thereof and defining separate parallel cooling and bypass passages both connecting with said second stage exhaust ports and said first stage inlet ports and providing gas flow paths therebetween, said cooling passage having cooling heat exchange means in the flow path between each of the connected inlet and exhaust ports, and valve means in said manifold means and movable between a first position blocking flow through said cooling passage and a second position blocking flow through said bypass passage, whereby movement of said valve means modulates flow through and around said heat exchange means and thereby regulates the temperature of interstage gases supplied to said second stage inlet ports, and means for adding supplemental combustion air to the interstage gases before their admission to said second stage combustion chambers.

* * * * *